(12) United States Patent
Park et al.

(10) Patent No.: US 12,418,018 B2
(45) Date of Patent: Sep. 16, 2025

(54) NEGATIVE ELECTRODE FOR LITHIUM SECONDARY BATTERY, LITHIUM SECONDARY BATTERY COMPRISING NEGATIVE ELECTRODE, AND METHOD FOR PREPARING NEGATIVE ELECTRODE FOR LITHIUM SECONDARY BATTERY

(71) Applicant: LG ENERGY SOLUTION, LTD., Seoul (KR)

(72) Inventors: Su Jin Park, Daejeon (KR); Jaewook Lee, Daejeon (KR); Yohan Kwon, Daejeon (KR); Chan Soo Jun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/957,749

(22) Filed: Sep. 30, 2022

(65) Prior Publication Data
US 2023/0125989 A1 Apr. 27, 2023

(30) Foreign Application Priority Data

Oct. 22, 2021 (KR) .................. 10-2021-0142046
Jan. 19, 2022 (KR) .................. 10-2022-0007656

(51) Int. Cl.
*H01M 4/134* (2010.01)
*H01M 4/1395* (2010.01)
*H01M 4/36* (2006.01)
*H01M 4/02* (2006.01)

(52) U.S. Cl.
CPC ......... *H01M 4/134* (2013.01); *H01M 4/1395* (2013.01); *H01M 4/366* (2013.01); *H01M 2004/027* (2013.01)

(58) Field of Classification Search
CPC .......... H01M 2004/027; H01M 4/364; H01M 4/366; H01M 4/134; H01M 4/1395; H01M 4/384
See application file for complete search history.

(56) References Cited

U.S. PATENT DOCUMENTS

| 7,824,801 | B2 | 11/2010 | Kogetsu et al. |
| 9,537,145 | B2 | 1/2017 | Osada et al. |
| 10,109,856 | B2 | 10/2018 | Sawa |
| 10,868,327 | B2 | 12/2020 | Matsushita et al. |

(Continued)

FOREIGN PATENT DOCUMENTS

| EP | 3 872 896 A1 | 9/2021 |
| JP | 2004-349162 A | 12/2004 |

(Continued)

OTHER PUBLICATIONS

Japanese Office Action for Japanese Application No. 2023-549666, dated Mar. 18, 2025, with English translation.

(Continued)

*Primary Examiner* — Yoshitoshi Takeuchi
(74) *Attorney, Agent, or Firm* — Birch, Stewart, Kolasch & Birch, LLP

(57) ABSTRACT

Disclosed is a negative electrode composition, a negative electrode for a lithium secondary battery, including the same, and a lithium secondary battery including the negative electrode, and a method for preparing a negative electrode composition.

10 Claims, 3 Drawing Sheets

(56) References Cited

U.S. PATENT DOCUMENTS

| | | | |
|---|---|---|---|
| 2011/0123866 A1* | 5/2011 | Pan | H01M 4/525 |
| | | | 427/458 |
| 2011/0159368 A1 | 6/2011 | Hirose et al. | |
| 2014/0057178 A1 | 2/2014 | Park et al. | |
| 2015/0340691 A1 | 11/2015 | Inoue et al. | |
| 2016/0087268 A1 | 3/2016 | Hotta et al. | |
| 2016/0285081 A1* | 9/2016 | Matsuno | H01M 4/386 |
| 2020/0144603 A1 | 5/2020 | Si et al. | |
| 2021/0119200 A1 | 4/2021 | Nam | |
| 2021/0226202 A1 | 7/2021 | Liang et al. | |
| 2021/0391567 A1* | 12/2021 | Liao | H01M 4/483 |

FOREIGN PATENT DOCUMENTS

| | | |
|---|---|---|
| JP | 2009-80971 A | 4/2009 |
| JP | 2011-233497 A | 11/2011 |
| JP | 2014-35885 A | 2/2014 |
| JP | 2016-1603 A | 1/2016 |
| JP | 2016-181331 A | 10/2016 |
| JP | 6237775 B2 | 11/2017 |
| JP | 8237777 B2 | 11/2017 |
| JP | WO2017/159073 A1 | 8/2018 |
| JP | 2020-507906 A | 3/2020 |
| JP | 2020-509541 A | 3/2020 |
| KR | 10-0814591 B1 | 3/2008 |
| KR | 10-2008-0074241 A | 8/2008 |
| KR | 10-2014-0026855 A | 3/2014 |
| WO | WO 2019/009239 A1 | 1/2019 |

OTHER PUBLICATIONS

Extended European Search Report for European Application No. 22883825.6, dated Mar. 3, 2025.

Japanese Office Action for Japanese Application No. 2023-549666, dated Sep. 17, 2024, with English translation.

* cited by examiner

[Figure 1A]
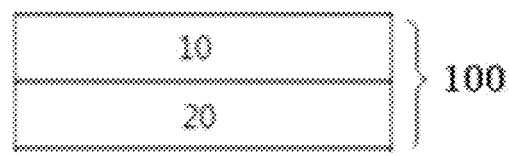
[Figure 1B]
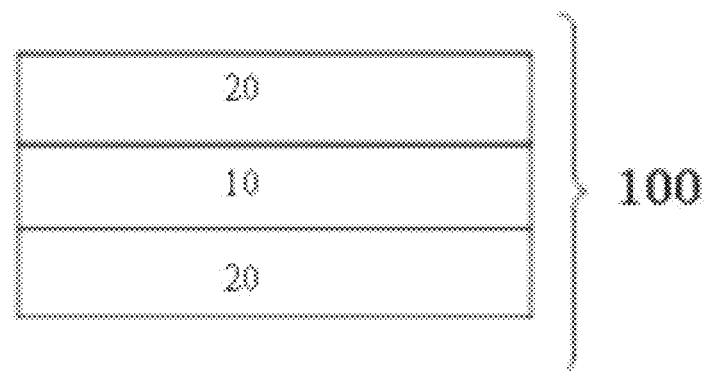

[Figure 2A]
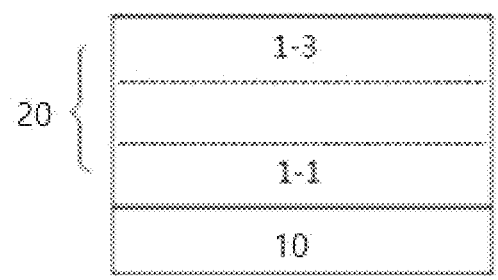
[Figure 2B]
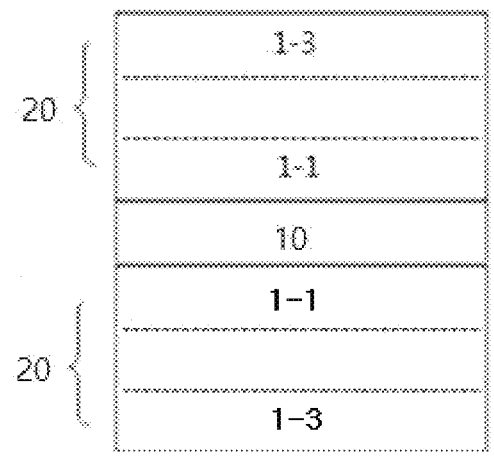

[Figure 3]
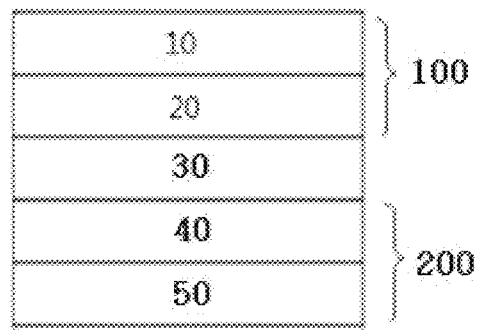
[Figure 4]
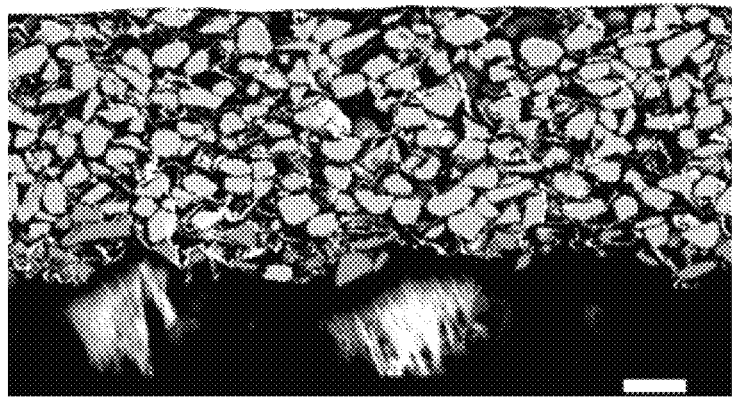

NEGATIVE ELECTRODE FOR LITHIUM SECONDARY BATTERY, LITHIUM SECONDARY BATTERY COMPRISING NEGATIVE ELECTRODE, AND METHOD FOR PREPARING NEGATIVE ELECTRODE FOR LITHIUM SECONDARY BATTERY

CROSS-REFERENCE TO RELATED APPLICATIONS

This application claims priority to and the benefit of Korean Patent Application No. 10-2021-0142046 filed in the Korean Intellectual Property Office on Oct. 22, 2021, and No. 10-2022-0007656 filed in the Korean Intellectual Property Office on Jan. 19, 2022 the entire contents of which are expressly incorporated herein by reference.

TECHNICAL FIELD

The present application relates to a negative electrode for a lithium secondary battery, a lithium secondary battery comprising a negative electrode, and a method for preparing negative electrode for a lithium secondary battery.

BACKGROUND ART

Demands for the use of alternative energy or clean energy are increasing due to the rapid increase in the use of fossil fuels, and as a part of this trend, the most actively studied field is a field of electricity generation and electricity storage using an electrochemical reaction.

Currently, representative examples of an electrochemical device using such electrochemical energy comprise a secondary battery, and the usage areas thereof are increasing more and more.

As technology development of and demand for mobile devices have increased, demands for secondary batteries as an energy source have been rapidly increased. Among such secondary batteries, lithium secondary batteries having high energy density and voltage, long cycle life, and low self-discharge rate have been commercialized and widely used. Further, as an electrode for such a high capacity lithium secondary battery, studies have been actively conducted on a method for preparing a high-density electrode having a higher energy density per unit volume.

In general, a secondary battery is composed of a positive electrode, a negative electrode, an electrolyte, and a separator. The negative electrode comprises a negative electrode active material for intercalating and de-intercalating lithium ions from the positive electrode, and as the negative electrode active material, a silicon-containing particle having high discharge capacity may be used.

In particular, recently, in response to the demand for a high-density energy battery, studies have been actively conducted on a method for increasing the capacity using a silicon-containing compound such as Si/C or SiOx, which has a 10-fold higher capacity than a graphite-containing material, as a negative electrode active material. However, the silicon-containing compound, which is a high-capacity material, is a material having a high capacity compared to graphite used in the related art, and has excellent capacity characteristics, but the volume rapidly expands during the charging process to disconnect the conductive path, resulting in deterioration in battery characteristics, and accordingly, the capacity decreases from the initial stage.

When the charging and discharging cycle of a silicon-containing negative electrode is repeated, lithium ion are not uniformly charged in the depth direction of the negative electrode, a silicon-containing active material present on the surface during charging and discharging first degrades, and as a result, pulverization occurs, and as the battery cycle progresses, the reaction heterogeneity is aggravated in the depth direction of the negative electrode, and this change makes the service life performance of an electrode to which the silicon-containing active material is applied rapidly deteriorate. For instance, a negative electrode using a Si active material may have superior capacity characteristics compared to a negative electrode using a SiO active material and a carbon-containing active material. However, in the case of the Si active material, electrode degradation at the surface may be concentrated due to rapid reaction with Li ions and Si particles during charging/discharging. That is, the reaction mainly takes place on the surface due to the "reaction heterogeneity" of the reaction between Li ions and Si particles. Thus, the reaction in the depth direction of the negative electrode may not be uniformly performed, so the lifespan performance may be deteriorated due to the deterioration of the surface of the negative electrode.

Thus, to solve problems when the silicon-containing compound is used as a negative electrode active material, measures to adjust the driving potential, additionally, measures to suppress the volume expansion itself such as methods of coating the active material layer with a thin film and methods of adjusting the particle diameter of the silicon-containing compound, various measures to prevent the conductive path from being disconnected, and the like have been discussed, but there is a limitation in the application of the measures because the performance of a battery may rather deteriorate due to the measures, so that there is still a limitation in the commercialization of preparation of a battery having a negative electrode with a high content of the silicon-containing compound.

Therefore, to solve the aforementioned problems, studies have been conducted to improve the service life performance of a silicon-containing negative electrode by solving the heterogeneity of the internal reaction on the surface portion and in the depth direction in the silicon-containing negative electrode.

RELATED ART DOCUMENT

Patent Document (Patent Document 1) Japanese Patent Application Laid-Open No. 2009-080971

SUMMARY OF THE INVENTION

The present invention has been made in an effort to provide a negative electrode for a lithium secondary battery, which can maximize the capacity using a silicon-containing active material in the negative electrode and simultaneously prevent the electrode surface degradation during the charging and discharging cycle, which is an existing problem without generating the problem of deterioration in capacity, a lithium secondary battery comprising a negative electrode, and a method for preparing a negative electrode for a lithium secondary battery.

An exemplary embodiment of the present invention provides a negative electrode for a lithium secondary battery, comprising: a negative electrode current collector layer; and a negative electrode active material layer provided on at least one surface of the negative current collector layer, in which the negative electrode active material layer comprises a negative electrode composition comprising: a negative electrode active material; a negative electrode conductive material; and a negative electrode binder, in which the negative electrode active material comprises Si and SiO, a weight ratio of the Si:SiO is 65:35 to 85:15, and the negative electrode active material layer has a higher content of SiO on a surface opposite to a surface facing the negative electrode current collector layer than a content of SiO on a surface facing the negative electrode current collector layer.

Another exemplary embodiment provides a method for preparing a negative electrode for a lithium secondary battery, the method comprising: applying a first negative electrode composition comprising: a first negative electrode active material comprising Si and SiO; a first negative electrode conductive material; and a first negative electrode binder onto a negative electrode current collector layer; and forming a second negative electrode active material layer by applying a second negative electrode composition comprising SiO onto the first negative electrode composition, in which the Si is included in an amount of 60 parts by weight based on 100 parts by weight of the negative electrode active material included in the first negative electrode composition, a weight ratio of Si:SiO of the negative electrode active material layer, including the first and second negative electrode composition, is 65:35 to 85:15, and the negative electrode active material layer has a higher content of SiO on a surface opposite to a surface facing the negative electrode current collector layer than a content of SiO on a surface facing the negative electrode current collector layer. For instance, the first negative electrode composition is applied on the negative electrode current collector, and the second negative electrode composition is applied on the first negative electrode composition. This can include both "wet on wet" and "wet on dry" processes. In a "wet on wet" process, the second negative electrode composition is applied on the first negative electrode composition while the first negative electrode composition is still wet, hence "wet on wet." In a "wet on dry" process, the first negative electrode composition is dried (at least partially), and then the second negative electrode composition is applied on the first negative electrode composition, hence "wet on dry."

Still another exemplary embodiment provides a lithium secondary battery comprising: a positive electrode; the negative electrode for a lithium secondary battery according to the present application; a separator provided between the positive electrode and the negative electrode; and an electrolyte.

The negative electrode for a lithium secondary battery according to an exemplary embodiment of the present invention is characterized in that a negative electrode active material comprises Si and SiO, in which the negative electrode active material has a higher content of SiO on a surface opposite to a surface facing the negative electrode current collector layer than a content of SiO on a surface facing the negative electrode current collector layer. Accordingly, the negative electrode has a feature capable of solving the reaction heterogeneity in the depth direction of the negative electrode in spite of repetition of the charging and discharging cycle of the battery by allowing a large amount of SiO having better reaction durability than Si to be distributed on an uppermost surface of the negative electrode.

In the case of the negative electrode for a lithium secondary battery according to an exemplary embodiment of the present invention, the ratio of Si:SiO included in the negative electrode active material satisfies 65:35 to 85:15. The negative electrode according to the present application has very good negative electrode capacity characteristics in terms of energy density by comprising Si at a specific ratio compared to SiO, and has a feature of solving a problem of poor service life caused by the reaction heterogeneity by comprising Si according to the concentration gradient of SiO in the negative electrode active material layer as described above.

The negative electrode for a lithium secondary battery according to an exemplary embodiment of the present invention constitutes the concentration gradient of an active material in a single-layered negative electrode active material layer rather than using the negative electrode active material layer as two layers. Accordingly, the negative electrode for a lithium secondary battery according to an exemplary embodiment of the present invention has a feature capable of preventing a desorption phenomenon with the negative electrode current collector layer by comprising a small amount of Si which experiences a relatively small volume expansion depending on the charging and discharging even on a surface where the negative electrode current collector layer and the negative electrode active material layer are brought into contact with each other.

BRIEF DESCRIPTION OF THE DRAWINGS

FIG. 1A is a view illustrating the stacking structure of a negative electrode for a lithium secondary battery according to an exemplary embodiment of the present application.

FIG. 1B is a view illustrating the stacking structure of a negative electrode for a lithium secondary battery according to another exemplary embodiment of the present application.

FIG. 2A is a view illustrating the stacking structure of a negative electrode for a lithium secondary battery according to an exemplary embodiment of the present application.

FIG. 2B is a view illustrating the stacking structure of a negative electrode for a lithium secondary battery according to another exemplary embodiment of the present application.

FIG. 3 is a view illustrating the stacking structure of a lithium secondary battery according to an exemplary embodiment of the present application.

FIG. 4 is a SEM image illustrating a cross-section of a negative electrode wherein the negative electrode active material layer is formed on both surfaces of the negative electrode current collector.

DETAILED DESCRIPTION

Prior to the description of the present invention, some terms will be first defined.

When one part "includes" one constituent element in the present specification, unless otherwise specifically described, this does not mean that another constituent element is excluded, but means that another constituent element may be further included.

In the present specification, 'p to q' means a range of 'p or more and q or less'.

In the present specification, "specific surface area" is measured by the BET method, and is specifically calculated from an amount of nitrogen gas adsorbed under liquid nitrogen temperature (77K) using BELSORP-mini II manufactured by BEL Japan, Inc. That is, in the present application, the BET specific surface area may mean a specific surface area measured by the measurement method.

In the present specification, "Dn" means the particle diameter distribution, and means the particle diameter at the n % point of the cumulative distribution of the number of particles according to the particle diameter. That is, D50 is the particle diameter (average particle diameter) at the 50% point of the cumulative distribution of the number of particles according to the particle diameter, D90 is the particle diameter at the 90% point of the cumulative distribution of the number of particles according to the particle diameter, and D10 is the particle diameter at the 10% point of the cumulative distribution of the number of particles according to the particle diameter. Meanwhile, the particle diameter distribution may be measured using a laser diffraction method. Specifically, after a powder to be measured is dispersed in a dispersion medium, a particle size distribution is calculated by introducing the resulting dispersion into a commercially available laser diffraction particle size measurement device (for example, Microtrac S3500) to measure the difference in diffraction pattern according to the particle size when particles pass through the laser beam.

In the present specification, the fact that a polymer comprises a monomer as a monomer unit means that the monomer participates in a polymerization reaction, and thus is included as a repeating unit in the polymer. In the present specification, when the polymer comprises a monomer, it is interpreted to be the same as when the polymer comprises a monomer as a monomer unit.

In the present specification, the 'polymer' is understood to be used in a broad sense, comprising a copolymer, unless otherwise specified as a 'homopolymer'.

In the present specification, a weight average molecular weight (Mw) and a number average molecular weight (Mn) are polystyrene-conversion molecular weights measured by gel permeation chromatography (GPC) using a monodisperse polystyrene polymer (standard sample) with various degrees of polymerization commercially available for the measurement of the molecular weight as a standard material. In the present specification, the molecular weight means a weight average molecular weight unless otherwise described. Hereinafter, the present invention will be described in detail with reference to drawings, such that a person with ordinary skill in the art to which the present invention pertains can easily carry out the present invention. However, the present invention can be implemented in various different forms, and is not limited to the following description.

An exemplary embodiment of the present specification provides a negative electrode for a lithium secondary battery, comprising: a negative electrode current collector layer; and a negative electrode active material layer provided on at least one surface of the negative current collector layer, in which the negative electrode active material layer comprises a negative electrode composition comprising: a negative electrode active material; a negative electrode conductive material; and a negative electrode binder, in which the negative electrode active material comprises Si and SiO, a weight ratio of the Si:SiO is 65:35 to 85:15, and the negative electrode active material layer has a higher content of SiO on a surface opposite to a surface facing the negative electrode current collector layer than a content of SiO on a surface facing the negative electrode current collector layer.

In another exemplary embodiment, provided is a negative electrode for a lithium secondary battery, in which the negative electrode active material layer has a concentration gradient where the content of SiO is increased in a direction from a surface facing the negative electrode current collector layer to a surface opposite to the surface facing the negative electrode current collector layer.

In the case of the negative electrode for a lithium secondary battery according to an exemplary embodiment of the present invention, a negative electrode active material comprises Si and SiO, and the negative electrode active material layer has the aforementioned concentration gradient. Accordingly, since the content of Si decreases toward the surface of the negative electrode active material layer facing the negative electrode current collector layer, the negative electrode is mainly characterized in that it is possible to solve the reaction heterogeneity in the depth direction of the negative electrode in spite of repetition of the charging and discharging cycle of the battery by allowing a larger amount of SiO having better reaction durability than Si to be distributed on an uppermost surface of the negative electrode.

That is, the negative electrode active material layer according to the present application comprises Si and SiO at the aforementioned weight ratio in order to maximize capacity characteristics while using, for instance, a single-layered negative electrode active material layer, and further, a main object of the present invention is to enhance the durability by minimizing the content part of Si on a surface portion of the negative electrode active material layer through a concentration gradient of SiO in the negative electrode active material layer with respect to a problem of the service life characteristics caused by the electrode surface degradation.

FIG. 1A is a view illustrating the stacking structure of a negative electrode for a lithium secondary battery according to an exemplary embodiment of the present application. Specifically, it is possible to confirm a negative electrode 100 for a lithium secondary battery, comprising a negative electrode active material layer 20 on one surface of a negative electrode current collector layer 10, and FIG. 1A illustrates the negative electrode active material layer formed on one surface, but the negative electrode active material layer may be included on both surfaces of the negative electrode current collector layer. For instance, as illustrated in FIG. 1B, according to another embodiment of the present application, it is possible to confirm a negative electrode 100 for a lithium secondary battery, comprising a negative electrode active material layer 20 on both surfaces of a negative electrode current collector layer 10. The negative electrode active material layer 20 is preferably present on both surfaces of the negative electrode current collector.

If the composition of the negative active material layer is coated on both sides of the negative electrode current collector, the composition of the active material layers may be the same or different from each other. If the compositions are different, one composition will be that according to the present disclosure, while the other may be a commonly used active material layer such as a carbon-containing or silicon-containing active material layer. It is preferable that both sides of the active material layer have the same composition.

In an exemplary embodiment of the present application, the negative electrode current collector layer generally has a thickness of 1 μm to 100 μm. The negative electrode current collector layer is not particularly limited as long as the negative electrode current collector layer has high conductivity without causing a chemical change to the battery, and for example, it is possible to use copper, stainless steel, aluminum, nickel, titanium, fired carbon, a material in which the surface of copper or stainless steel is surface-treated with carbon, nickel, titanium, silver, and the like, an aluminum-cadmium alloy, and the like. In addition, the negative electrode current collector layer may also increase the bonding strength of a negative electrode active material by forming fine convex and concave irregularities on the surface thereof, and the negative electrode current collector layer may be used in various forms such as a film, a sheet, a foil, a net, a porous body, a foaming body, and a nonwoven body.

In an exemplary embodiment of the present application, provided is a negative electrode for a lithium secondary battery, in which the negative electrode current collector layer has a thickness of 1 μm or more and 100 μm or less, and the negative electrode active material layer has a thickness of 20 μm or more and 500 μm or less. This range encompasses both with the negative active material layer on one side of the negative electrode current collector as well as the negative active material layer on both sides of the negative electrode current collector.

However, the thickness may be variously modified depending on the type and use of the negative electrode used, and is not limited thereto.

In an exemplary embodiment of the present application, in a negative electrode for a lithium secondary battery, comprising: a negative electrode active material layer provided on at least one surface of the negative electrode current collector layer, the negative electrode active material layer comprises a negative electrode composition comprising: a negative electrode active material; a negative electrode conductive material; and a negative electrode binder.

In an exemplary embodiment of the present application, the negative electrode active material comprises Si and SiO, and the ratio of Si:SiO may be 65:35 to 85:15.

In another exemplary embodiment, the negative electrode active material comprises Si and SiO, and the ratio of Si:SiO may satisfy a range of 65:35 to 85:15, preferably 70:30 to 85:15, and more preferably 70:30 to 80:20.

From the fact that the ratio of Si:SiO included in the negative electrode active material satisfies the above ratio of 65:35 to 85:15, the negative electrode active material has a feature in which the capacity of the negative electrode is excellent in terms of energy density by comprising a larger amount of Si than that of SiO, and as Si is included, a problem in that the service life is may not be good is solved according to the concentration gradient of SiO in the negative electrode active material layer.

In an exemplary embodiment of the present application, provided is a negative electrode for a lithium secondary battery, in which the negative electrode active material layer has a concentration gradient where the content of SiO is increased and the content of Si is decreased in a direction from a surface facing the negative electrode current collector layer to a surface opposite to the surface facing the negative electrode current collector layer.

In an exemplary embodiment of the present application, provided is a negative electrode for a lithium secondary battery, in which the negative electrode active material layer comprises: a junction region comprising a surface facing the negative electrode current collector layer; and a surface region comprising a surface opposite to the surface facing the negative electrode current collector, the weight ratio of Si:SiO in the junction region is 95:5 to 100:0, and the weight ratio of Si:SiO in the surface region is 5:95 to 0:100.

The ratios of Si and SiO in the surface region and junction region may be confirmed by a cross-sectional analysis. That is, for the ratio, Si and SiO are distinguished by the peaks of Si and O using images of the cross-section of the negative electrode active material layer to perform energy dispersive spectroscopy (EDS), respectively, and the aforementioned weight ratio may be measured by specifying particles in the image. In an exemplary embodiment of the present application, the junction region means an internal region of the negative electrode active material layer comprising a surface of the negative electrode active material layer facing the current collector layer. In this case, the junction region may mean a region having a thickness X1% (defined below) measured from a surface facing the negative electrode current collector layer based on the total thickness of the negative electrode active material layer.

In an exemplary embodiment of the present application, the surface region means an internal region of the negative electrode active material layer comprising a surface opposite to the surface facing the negative electrode current collector layer. In this case, the surface region may mean a region having a thickness X1% measured from a surface opposite to the surface facing the negative electrode current collector layer based on the total thickness of the negative electrode active material layer.

In an exemplary embodiment of the present application, the X1 may independently satisfy a range of 0.1 or more and 10 or less, preferably 1 or more and 5 or less.

In FIG. 2A, the surface region and the junction region can be confirmed. Specifically, it can be confirmed that the surface region 1-3 is an internal region of the negative electrode active material layer comprising a surface opposite to a surface facing the negative electrode current collector layer, and the junction region 1-1 is an internal region of the negative electrode active material layer comprising a surface facing the current collector layer of the negative electrode active material layer.

In FIG. 2B, the structure is the same as FIG. 2A, except the negative electrode active material layer 20 is present on both surfaces of the current collector 10.

As an example, when the negative electrode active material layer has a total thickness of 100 μm, the junction region may mean a region (X1=5%) of a thickness 5 μm measured from the surface facing the negative electrode current collector layer.

As an example, when the negative electrode active material layer has a total thickness of 100 μm, the surface region may mean a region (X1=5%) of a thickness 5 μm measured from a surface opposite to the surface facing the negative electrode current collector layer.

In an exemplary embodiment of the present application, the weight ratio of Si:SiO in the junction region may be 95:5 to 100:0, preferably 97.5:2.5 to 100:0.

In an exemplary embodiment of the present application, the weight ratio of Si:SiO in the surface region may be 5:95 to 0:100, preferably 2.5:97.5 to 0:100.

In an exemplary embodiment of the present application, provided is a negative electrode for a lithium secondary battery, in which the negative electrode active material layer is divided into three parts (including, for instance, three equal parts) in the thickness direction, and is sequentially divided and displayed as a first active material layer region; a second active material layer region; and a third active material layer region, the first active material layer region faces and may directly contact the negative electrode current collector layer, the first active material layer region comprises SiO in an amount of 10 parts by weight or less based on 100 parts by weight of the negative electrode active material, and the third active material layer region comprises SiO in an amount of 80 parts by weight or more based on 100 parts by weight of the negative electrode active material.

In an exemplary embodiment of the present application, the division of the negative electrode active material layer may be into three parts (which may include three equal parts or three parts of different thickness) in the thickness direction and may be a virtual division of the total thickness of the negative electrode active material layer into three parts based on the thickness direction of the negative electrode active material layer, and the division into equal parts may mean that all the divided regions are equally divided, but may comprise some deviation.

In another embodiment of the present application, the division of the negative electrode active material into three parts need not be an equal division.

In an exemplary embodiment of the present application, the fact that the negative electrode active material layer is sequentially divided and displayed as the first active material layer region; the second active material layer region; and the third active material layer region may mean that the negative electrode active material layer is divided and displayed as sequentially stacked regions comprising the first active material layer region commencing on the surface facing the negative electrode current collector layer.

In an exemplary embodiment of the present application, the first active material layer region in the negative electrode active material layer is a region which may be in contact, for instance, direct contact, with the negative electrode current collector layer.

In an exemplary embodiment of the present application, SiO may be included in an amount of parts by weight or less based on 100 parts by weight of the negative electrode active material included in the first active material layer region in the negative electrode active material layer.

In another exemplary embodiment, SiO may be included in an amount of 10 parts by weight or less, preferably 8 parts by weight or less, and more preferably 5 parts by weight or less, and may be included in an amount of 1 part by weight or more, based on 100 parts by weight of the negative electrode active material included in the first active material layer region in the negative electrode active material layer.

In still another exemplary embodiment, Si may be included in an amount of 90 parts by weight or more, preferably 92 parts by weight or more, and more preferably 95 parts by weight or more, and may be included in an amount of 99 parts by weight or less, based on 100 parts by weight of the negative electrode active material included in the first active material layer region in the negative electrode active material layer.

The negative electrode of the present application forms a concentration gradient of active material in a single-layered negative electrode active material layer rather than using the negative electrode active material layer as two distinct layers, and has a feature in which a desorption phenomenon from the negative electrode current collector layer can be prevented by comprising SiO having a small volume expansion due to charging and discharging in the above range in the first active material layer region in which the negative electrode current collector layer and the negative electrode active material layer are brought into contact with each other. That is, it is possible to have an effect of enhancing the adhesive force with the current collector layer compared to the case where the negative electrode active material layer is divided into two layers and used.

In an exemplary embodiment of the present application, the second active material layer region in the negative electrode active material layer may mean a region present between the first active material layer region and the third active material layer region.

In an exemplary embodiment of the present application, SiO may be included in an amount of 30 parts by weight or more based on 100 parts by weight of the negative electrode active material included in the second active material layer region in the negative electrode active material layer. The second active material layer region corresponds to an interface region in which the first negative electrode composition and the second negative electrode composition are mixed.

In another exemplary embodiment, SiO may be included in an amount of 30 parts by weight or more, preferably 40 parts by weight or more, and may be included in an amount of 50 parts by weight or less, based on 100 parts by weight of the negative electrode active material included in the second active material layer region in the negative electrode active material layer.

In an exemplary embodiment of the present application, the second active material layer is an interface region in which a first negative electrode composition and a second negative electrode composition are mixed by a wet on wet method among preparation methods to be described below, and has a feature capable of solving the reaction heterogeneity in the depth direction of the negative electrode in spite of repetition of the cycle of the battery as the SiO is included in the above content part.

In an exemplary embodiment of the present application, the third active material layer region in the negative electrode active material layer is a region in a direction farthest from the negative electrode current collector layer, and may mean a region of the upper (e.g., outermost) portion of the second active material layer in the negative electrode active material layer.

In an exemplary embodiment of the present application, provided is a negative electrode for a lithium secondary battery, in which SiO is included in an amount of 80 parts by weight or more based on 100 parts by weight of the negative electrode active material included in the third active material layer region in the negative electrode active material layer.

In another exemplary embodiment, SiO may be included in an amount of 80 parts by weight or more, preferably 85 parts by weight or more, and more preferably 90 parts by weight or more, and may be included in an amount of 95 parts by weight or less, based on 100 parts by weight of the negative electrode active material included in the third active material layer region in the negative electrode active material layer.

In still another exemplary embodiment, Si may be included in an amount of 20 parts by weight or less, preferably 15 parts by weight or less, and more preferably 10 parts by weight or less, and may be included in an amount of 5 parts by weight or more, based on 100 parts by weight of the negative electrode active material included in the third active material layer region in the negative electrode active material layer.

The negative electrode has a feature capable of solving the reaction heterogeneity in the thickness direction of the negative electrode in spite of repetition of the cycle of the battery by allowing SiO having better reaction durability than Si to be distributed in the above content part on an uppermost surface of the third active material layer region as described above, and additionally has a feature in which durability is excellent compared to the case where Si is provided because SiO is provided in a large amount on the surface of the negative electrode during pre-lithiation in the use of a silicon-containing negative electrode.

That is, in the case of the negative electrode for a lithium secondary battery according to an exemplary embodiment of the present application, the active material included in the entire negative electrode active material layer includes Si and SiO, and a main object of the present invention is to simultaneously solve a problem in that the service life characteristics are not good when Si is included in a large amount by a concentration gradient of SiO while it is possible to maximize the efficiency of the negative electrode because the proportion of Si is high.

In one embodiment, each layer or layer region of negative electrode active material layer may have a substantially flat surface. Included in this, the outermost surface layer of the negative electrode active material layer has a substantially flat surface. The surface of the negative electrode active material layer is continuous, and/or uniform across the entire surface area of the negative electrode, or uniformly covers a substantial portion of the negative electrode current collector layer. The outermost surface layer of the negative electrode may include the surface region of the negative electrode active material layer, and/or the third active material layer region of the negative electrode active material layer.

As illustrated in the SEM image of FIG. 4, the negative electrode active material layer (seen in FIG. 4 to be coated on both sides of the negative electrode current collector) has a substantially flat surface and uniformly covers a substantial portion of the negative electrode current collector. In FIG. 4, the center portion (white) represents the negative electrode current collector, with the negative electrode active material layers being formed on both sides thereof.

In an exemplary embodiment of the present application, provided is a negative electrode for a lithium secondary battery, in which the SiO is present as particles having a D50 of 1 μm or more and 10 μm or less, and has a Si crystal grain size of 100 nm or less.

Meanwhile, the negative electrode active material of the present invention may have an average particle diameter (D50) of 5 μm to 10 μm, specifically 5.5 μm to 8 μm, and more specifically 6 μm to 7 μm. When the average particle diameter is included in the above range of 5 μm to 10 μm, the viscosity of a negative electrode slurry is formed in a suitable range because the specific surface area of the particle is included in a suitable range. Accordingly, the dispersion of the particles constituting the negative electrode slurry is facilitated. Furthermore, the size of a silicon-containing active material has a value equal to or more than the above lower limit value, and since a composite composed of a conductive material and a binder in the negative electrode slurry makes a contact area between silicon particles and conductive materials excellent, the possibility that the conductive network lasts is increased, so that the capacity retention rate is increased. Meanwhile, when the average particle diameter satisfied the above range, excessively large silicon particles are eliminated to form a smooth surface of the negative electrode, and accordingly, it is possible to prevent the heterogeneous phenomenon of the current density during charging and discharging.

In an exemplary embodiment of the present application, the Si generally has a characteristic BET surface area. The BET surface area of Si is preferably 0.01 to 150.0 m²/g, more preferably 0.1 to 100.0 m²/g, particularly preferably 0.2 to 80.0 m₂/g, and most preferably 0.2 to 18.0 m²/g. The BET surface area is measured by DIN 66131 (using nitrogen).

In an exemplary embodiment of the present application, Si may be present, for example, in a crystalline or amorphous form, and preferably is not porous. Si is preferably a spherical or fragment-shaped particle. Alternatively, but less preferably, Si may also have a fibrous structure or be present in the form of a film or coating comprising silicon.

In an exemplary embodiment of the present application, the description on Si may be applied, except that the SiO is in a state in which the Si is oxidized, and the SiO may have an average particle diameter (D50) of 1 μm to 10 μm, specifically 5.5 μm to 8 μm, and more specifically 6 μm to 7 μm.

The Si crystal grain size of the SiO may satisfy 100 nm or less, preferably 90 nm or less, and more preferably 80 nm or less, and may be 10 nm or more.

In an exemplary embodiment of the present application, the negative electrode active material comprises Si and SiO, and may specifically comprise only the two types.

In an exemplary embodiment of the present application, the negative electrode active material may be present in an amount of 60 parts by weight or more based on 100 parts by weight of the negative electrode composition.

In another exemplary embodiment, the negative electrode active material may be included in an amount of 60 parts by weight or more, preferably 65 parts by weight or more, and more preferably 70 parts by weight or more, and may be included in an amount of 95 parts by weight or less, preferably 90 parts by weight or less, and more preferably 80 parts by weight or less, based on 100 parts by weight of the negative electrode composition.

The negative electrode composition according to the present application has a feature in which by using a specific conductive material and a specific binder, which can suppress the volume expansion rate in the charging and discharging process even though a silicon-containing active material having a remarkably high capacity is used in the above range, the performance of the negative electrode does not deteriorate and output characteristics at charging and discharging are excellent even though the above range is included.

In an exemplary embodiment of the present application, the Si and SiO may have a non-circular form, and the circularity thereof is, for example, 0.9 or less, for example, 0.7 to 0.9, for example, 0.8 to 0.9, and for example, 0.85 to 0.9.

In the present application, the circularity is determined by the following Equation 1, where A is the area and P is the boundary line.

$$4 \pi A/P^2 \qquad \text{[Equation 1]}$$

In the related art, it was common to use only a graphite-containing compound as a negative electrode active material, but recently, as the demand for a high-capacity battery has increased, attempts to mix and use a silicon-containing compound have been increased in order to increase the capacity. However, in the case of the silicon-containing compound, there is a limitation that the volume rapidly expands in the process of charging/discharging to impair the conductive path formed in the negative electrode active material layer, consequently resulting in deterioration in the performance of the battery, so that the type of negative electrode conductive material used together with the silicon-containing active material is important.

In an exemplary embodiment of the present application, the negative electrode conductive material may comprise one or more selected from the group consisting of a dotted conductive material; a planar conductive material; and a linear conductive material.

In an exemplary embodiment of the present application, the dotted conductive material may be used to enhance the conductivity of the negative electrode, and means a conductive material having conductivity without inducing a chemical change. Specifically, the dotted conductive material may be at least one selected from the group consisting of natural graphite, artificial graphite, carbon black, acetylene black, Ketjen black, channel black, furnace black, lamp black, thermal black, a conductive fiber, fluorocarbon, an aluminum powder, a nickel powder, zinc oxide, potassium titanate, titanium oxide and a polyphenylene derivative, and may preferably comprise carbon black in terms of implementing high conductivity and being excellent in dispersibility.

In an exemplary embodiment of the present application, the dotted conductive material may have a BET specific surface area of 40 m$^2$/g or more and 70 m$^2$/g or less, preferably 45 m$^2$/g or more and 65 m$^2$/g or less, and more preferably 50 m$^2$/g or more and 60 m$^2$/g or less.

In an exemplary embodiment of the present application, the dotted conductive material may have a particle diameter of 10 nm to 100 nm, preferably 20 nm to 90 nm, and more preferably 40 nm to 60 nm.

In an exemplary embodiment of the present application, the negative electrode conductive material may comprise a planar conductive material.

The planar conductive material may increase the surface contact between silicon particles in the negative electrode to improve conductivity and simultaneously suppress the disconnection of the conductive path due to the volume expansion, and is used as a concept comprising a bulk conductive material or plate-like conductive material.

In an exemplary embodiment of the present application, the planar conductive material may comprise at least one selected from the group consisting of plate-like graphite, graphene, graphene oxide, and graphite flake, and may be preferably plate-like graphite.

In an exemplary embodiment of the present application, the planar conductive material may have an average particle diameter (D50) of 2 µm to 7 µm, specifically 3 µm to 6 µm, and more specifically 4 µm to 5 µm. When the average particle diameter satisfied the above range, sufficient particle size facilitates dispersion without causing an excessive increase in viscosity of the negative electrode slurry. Therefore, the dispersion effect is excellent when particles are dispersed using the same equipment and time.

In an exemplary embodiment of the present application, the planar conductive material provides a negative electrode composition having a D10 of 0.5 µm or more and 1.5 µm or less, a D50 of 2.5 µm or more and 3.5 µm or less, and a D90 of 7.0 µm or more and 15.0 µm or less.

In an exemplary embodiment of the present application, as the planar conductive material, it is possible to use a high specific surface area planar conductive material having a high BET specific surface area; or a low specific surface area planar conductive material.

In an exemplary embodiment of the present application, as the planar conductive material, a high specific surface area planar conductive material; or a low specific surface area planar conductive material may be used without limitation, but in particular, the planar conductive material according to the present application may be affected by the dispersion effect to some extent in the electrode performance, so that it may be particularly desirable to use a low specific surface area planar conductive material that does not cause a problem in dispersion.

In an exemplary embodiment of the present application, the planar conductive material may have a BET specific surface area of 5 m$^2$/g or more.

In another exemplary embodiment, the planar conductive material may have a BET specific surface area of 5 m$^2$/g or more and 500 m$^2$/g or less, preferably 5 m$^2$/g or more and 300 m$^2$/g or less, and more preferably 5 m$^2$/g or more and 300 m$^2$/g or less.

In still another exemplary embodiment, the planar conductive material is a high specific surface area planar conductive material, and the BET specific surface area may satisfy a range of 50 m$^2$/g or more and 500 m$^2$/g or less, preferably 80 m$^2$/g or more and 300 m$^2$/g or less, and more preferably 100 m$^2$/g or more and 300 m$^2$/g or less.

In yet another exemplary embodiment, the planar conductive material is a low specific surface area planar conductive material, and the BET specific surface may satisfy a range of 5 m$^2$/g or more and 40 m$^2$/g or less, preferably 5 m$^2$/g or more and 30 m$^2$/g or less, and more preferably 5 m$^2$/g or more and 25 m$^2$/g or less.

As other negative electrode conductive materials, there may be a linear conductive material such as carbon nanotubes. The carbon nanotubes may be bundle type carbon nanotubes. The bundle type carbon nanotubes may comprise a plurality of carbon nanotube units. Specifically, the term 'bundle type' used herein, unless otherwise specified, refers to a secondary shape in the form of a bundle or rope in which the plurality of carbon nanotube units is aligned side by side or intertwined in substantially the same orientation as a longitudinal axis of the carbon nanotube unit. In the carbon nanotube unit, a graphite sheet has a cylindrical shape with a nano-sized diameter and has an sp2 bond structure. In this case, the carbon nanotube unit may exhibit characteristics of a conductor or semiconductor depending on a structure and an angle at which the graphite sheet is rolled. The bundle type carbon nanotubes may be uniformly dispersed during the preparation of a negative electrode compared to entangled type carbon nanotubes, and the conductivity of the negative electrode may be improved by smoothly forming a conductive network in the negative electrode.

In an exemplary embodiment of the present application, the linear conductive material may be SWCNT.

In an exemplary embodiment of the present application, provided is a negative electrode for a lithium secondary battery, in which the negative electrode conductive material comprises: a planar conductive material; and a linear conductive material.

In the present invention, by comprising linear and planar conductive materials as a negative electrode conductive material without using the dotted conductive material as described above, the conductive path may be secured and output characteristics may be enhanced in the secondary battery of the present invention.

In an exemplary embodiment of the present application, provided is a negative electrode composition, in which the negative electrode conductive material is included in an amount of 10 parts by weight or more and 40 parts by weight or less, based on 100 parts by weight of the negative electrode composition.

In another exemplary embodiment, the negative electrode conductive material may be included in an amount of 10 parts by weight or more and 40 parts by weight or less, preferably 10 parts by weight or more and 30 parts by weight or less, and more preferably 15 parts by weight or more and 25 parts by weight or less, based on 100 parts by weight of the negative electrode composition.

In an exemplary embodiment of the present application, provided is a negative electrode for a lithium secondary battery, in which the planar conductive material and the linear conductive material are included in an amount of 90 parts by weight or more and 99.9 parts by weight or less; and 0.1 parts by weight or more and 10 parts by weight or less, respectively, based on 100 parts by weight of the negative electrode conductive material.

In another exemplary embodiment, the planar conductive material may be included in an amount of 90 parts by weight or more and 99.9 parts by weight or less, preferably 93 parts by weight or more and 99.9 parts by weight or less, and more preferably 95 parts by weight or more and 99.9 parts by weight or less, based on 100 parts by weight of the negative electrode conductive material.

In still another exemplary embodiment, the linear conductive material may be included in an amount of 0.1 parts by weight or more and 10 parts by weight or less, preferably 0.1 parts by weight or more and 7 parts by weight or less, and more preferably 0.1 parts by weight or more and 5 parts by weight or less, based on 100 parts by weight of the negative electrode conductive material.

In an exemplary embodiment of the present application, the negative electrode conductive material comprises a linear conductive material and a planar conductive material, and the ratio of the linear conductive material:the planar conductive material may satisfy 0.01:1 to 0.1:1.

In an exemplary embodiment of the present application, the ratio of the linear conductive material:the planar conductive material may satisfy 0.1:1.

In an exemplary embodiment of the present application, provided is a negative electrode for a lithium secondary battery, in which the negative electrode active material layer has a concentration gradient where the content of the planar conductive material is increased in a direction from a surface facing the negative electrode current collector layer to a surface opposite to the surface facing the negative electrode current collector layer.

In an exemplary embodiment of the present application, the negative electrode conductive material comprises a linear conductive material and a planar conductive material and satisfies the composition and the ratio, respectively, and furthermore, as the content of the planar conductive material is decreased in a direction away from the negative electrode current collector layer as described above, the negative electrode for a lithium secondary battery according to the present invention has a feature in which output characteristics at high C-rate are excellent because service life characteristics of the existing lithium secondary battery are not greatly affected and the number of points where the battery can be charged and discharged is increased, and has a feature in which the thickness of SiO on the surface of the negative electrode active material layer can be secured a little thicker.

The negative electrode conductive material according to the present application has a completely different configuration from a conductive material applied to the positive electrode. That is, the negative electrode conductive material according to the present application serves to capture a contact point between silicon-containing active materials in which the volume expansion of the electrode is very large due to charging and discharging, and the positive electrode conductive material serves to impart partial conductivity while playing a buffer role as a cushioning role when rolled, and the configuration and role thereof are completely different from those of the negative electrode conductive material of the present invention.

The negative electrode conductive material according to the present application is applied to a silicon-containing active material, and has a completely different configuration from a conductive material applied to a graphite-containing active material. That is, the conductive material used for the electrode having the graphite-containing active material simply has small particles with respect to the active material, and thus has the characteristics of enhancing the output characteristics and imparting partial conductivity, and the configuration and role thereof are completely different from those of the negative electrode conductive material applied together with the silicon-containing active material as in the present invention.

In an exemplary embodiment of the present application, the planar conductive material used as the above-described negative electrode conductive material has a structure and a role different from those of a carbon-containing active material generally used as a negative electrode active material. Specifically, the carbon-containing active material used as the negative electrode active material may be artificial graphite or natural graphite, and means a material that is processed into a spherical or dot shape and used in order to facilitate the storage and release of lithium ions.

In contrast, the planar conductive material used as the negative electrode conductive material is a material having a planar or plate-like shape, and may be expressed as plate-like graphite. That is, the planar conductive material is a material included to maintain the conductive path in the negative electrode active material layer, and means a material for securing a conductive path in the form of a surface in the negative electrode active material layer rather than a role of storing and releasing lithium.

That is, in the present application, the fact that plate-like graphite is used as a conductive material means that the plate-like graphite is processed into a planar or plate-like shape and used as a material that secures a conductive path rather than a role of storing or releasing lithium. In this case, the negative electrode active material included together has high capacity characteristics for lithium storage and release, and plays a role capable of storing and releasing all lithium ions transmitted from the positive electrode.

In contrast, in the present application, the fact that a carbon-containing active material is used as an active material means that the carbon-containing active material is processed into a dot or spherical shape and used as a material that serves to store or release lithium.

That is, in an exemplary embodiment of the present application, the BET specific surface area of artificial graphite or natural graphite, which is a carbon-containing active material may satisfy a range of 0.1 $m^2/g$ or more and 4.5 $m^2/g$ or less. In addition, plate-like graphite, which is a planar conductive material, is in a planar form, and may have a BET specific surface area of 5 $m^2/g$ or more.

In an exemplary embodiment of the present application, the negative electrode binder may comprise at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, polyacrylic acid, an ethylene-propylene-diene monomer (EPDM), a sulfonated EPDM, styrene butadiene rubber (SBR), fluorine rubber, polyacrylic acid and a material in which the hydrogen thereof is substituted with Li, Na, Ca, or the like, and may also comprise various polymers thereof.

The binder according to an exemplary embodiment of the present application plays a role of supporting the negative electrode active material and the negative electrode conductive material in order to prevent the distortion and structural deformation of the negative electrode structure in the volume expansion and relaxation of the silicon-containing active material, and when the above role is satisfied, all general negative electrode binders can be applied, specifically, a water-based binder can be used, and more specifically, a PAM-based binder can be used.

In an exemplary embodiment of the present application, the negative electrode binder may be included in an amount of 30 parts by weight or less, preferably 25 parts by weight or less, and more preferably 20 parts by weight or less, and may be included in an amount of 5 parts by weight or more and 10 parts by weight or more, based on 100 parts by weight of the negative electrode composition.

When a Si-containing material is used in the negative electrode compared to the existing carbon-containing negative electrode, a water-based binder is applied by the aforementioned parts by weight, so that a dotted conductive material having a low functional group content can be used, and depending on the feature, the dotted conductive material has hydrophobicity to have a feature in which the bonding strength with the conductive material/binder becomes excellent.

In another exemplary embodiment, provided is a method for preparing a negative electrode for a lithium secondary battery, the method comprising: applying a first negative electrode composition comprising: a negative electrode active material comprising Si and SiO; a negative electrode conductive material; and a negative electrode binder onto a negative electrode current collector layer; and forming a negative electrode active material layer by applying a second negative electrode composition comprising SiO onto the first negative electrode composition, in which the Si is included in an amount of 60 parts by weight or more based on 100 parts by weight of the negative electrode active material included in the first negative electrode composition, a weight ratio of Si:SiO of the negative electrode active material layer is 65:35 to 85:15, and the negative electrode active material layer has a higher content of SiO on a surface opposite to a surface facing the negative electrode current collector layer than a content of SiO on a surface facing the negative electrode current collector layer.

In the method for preparing the negative electrode, each composition contained in the negative electrode may be the same as described above.

In an exemplary embodiment of the present application, the applying of the first negative electrode composition comprising: the negative electrode active material comprising Si and SiO; the negative electrode conductive material; and the negative electrode binder onto the negative electrode current collector layer may comprise applying a first negative electrode slurry by comprising a solvent for forming a negative electrode slurry in the first negative electrode composition.

In an exemplary embodiment of the present application, the applying of the second negative electrode composition comprising SiO onto the first negative electrode composition may comprise applying a second negative electrode slurry by comprising a solvent for forming a negative electrode slurry in the second negative electrode composition.

In an exemplary embodiment of the present application, the loading amount of the first negative electrode slurry may satisfy a range of two-fold or more of the loading amount of the second negative electrode slurry.

In this case, the negative electrode active material layer according to the present application can form the weight ratio of Si:SiO as 65:35 to 85:15 by adjusting the loading amount of the first negative electrode slurry and the loading amount of the second negative electrode slurry.

In an exemplary embodiment of the present application, a negative electrode slurry may be prepared by comprising a solvent for forming a negative electrode slurry in the first negative electrode composition and the second negative electrode composition. In this case, the solid content of the negative electrode slurry may satisfy a range of 10% or more and 40% or less.

In an exemplary embodiment of the present application, the solid content of the first negative electrode slurry may be formed lower than the solid content of the second negative electrode slurry.

In an exemplary embodiment of the present application, provided is a method for preparing a negative electrode for a lithium secondary battery, in which the applying of the second negative electrode composition comprising SiO onto the first negative electrode composition comprises a wet on wet process.

The wet on wet method is a form in which the next paint is applied and spread before a first applied paint is dried, and may mean a process different from wet on dry and dry on dry.

In an exemplary embodiment of the present application, the applying of the second negative electrode composition comprising SiO onto the first negative electrode composition has a feature in which the negative electrode active material layer according to the present application may have a specific concentration gradient by a wet on wet process.

In an exemplary embodiment of the present application, in the forming of the negative electrode active material layer by applying the second negative electrode composition comprising SiO onto the first negative electrode composition, the negative electrode active material layer may be formed by mixing the interface between the applied first negative electrode composition and the applied second negative electrode composition. In this case, the mixing of the interface may be expressed as inter-mixing.

In an exemplary embodiment of the present application, provided is a method for preparing a negative electrode for a lithium secondary battery, in which the viscosity of the first negative electrode composition is lower than that of the second negative electrode composition.

For the inter-mixing to occur at the interface between the first negative electrode composition and the second negative electrode composition, the viscosity range may be adjusted as described above, and accordingly, it is possible to have the above-described concentration gradient.

In an exemplary embodiment of the present application, provided is a lithium secondary battery comprising: a positive electrode; the negative electrode for a lithium secondary battery according to the present application; a separator provided between the positive electrode and the negative electrode; and an electrolyte.

FIG. 3 is a view illustrating the stacking structure of a lithium secondary battery according to an exemplary embodiment of the present application. Specifically, it is possible to confirm a negative electrode 100 for a lithium secondary battery, which comprises a negative electrode active material layer 20 on one surface of a negative electrode current collector layer 10 and to confirm a positive electrode 200 for a lithium secondary battery, which comprises a positive electrode active material layer 40 on one surface of a positive electrode current collector layer 50, and it is shown that the negative electrode 100 for a lithium secondary battery and the positive electrode 200 for a lithium secondary battery are formed in a structure in which the electrodes are stacked with a separator 30 interposed therebetween.

The secondary battery according to an exemplary embodiment of the present specification may particularly comprise the above-described negative electrode for a lithium secondary battery. Specifically, the secondary battery may comprise a negative electrode, a positive electrode, a separator interposed between the positive electrode and the negative electrode, and an electrolyte, and the negative electrode is the same as the above-described negative electrode. Since the negative electrode has been described in detail, a specific description thereof will be omitted.

The positive electrode may comprise a positive electrode current collector layer and a positive electrode active material layer formed on the positive electrode current collector layer and comprising the positive electrode active material.

In the positive electrode, the positive electrode current collector layer is not particularly limited as long as the positive electrode current collector has conductivity without causing a chemical change to the battery, and for example, it is possible to use stainless steel, aluminum, nickel, titanium, fired carbon, or a material in which the surface of aluminum or stainless steel is surface-treated with carbon, nickel, titanium, silver, and the like. Further, the positive electrode current collector layer may typically have a thickness of 3 to 500 µm, and the adhesion of the positive electrode active material may also be enhanced by forming fine convex and concave irregularities on the surface of the current collector. For example, the positive electrode current collector may be used in various forms such as a film, a sheet, a foil, a net, a porous body, a foam, and a non-woven fabric body.

The positive electrode active material may be a typically used positive electrode active material. Specifically, the positive electrode active material comprises: a layered compound such as lithium cobalt oxide ($LiCoO_2$) and lithium nickel oxide ($LiNiO_2$) or a compound substituted with one or more transition metals; a lithium iron oxide such as $LiFe_3O_4$; a lithium manganese oxide such as Chemical Formula $Li_{1+c1}Mn_{2-c1}O_4$ ($0 \leq c1 \leq 0.33$), $LiMnO_3$, $LiMn_2O_3$, and $LiMnO_2$; a lithium copper oxide ($Li_2CuO_2$); a vanadium oxide such as $LiV_3O_8$, $V_2O_5$, and $Cu_2V_2O_7$; a Ni site type lithium nickel oxide expressed as chemical formula $LiNi_{1-c1}M_{c2}O_2$ (here, M is at least any one selected from the group consisting of Co, Mn, Al, Cu, Fe, Mg, B and Ga, and c2 satisfies $0.01 \leq c2 \leq 0.3$); a lithium manganese composite oxide expressed as chemical formula $LiMn_{2-c3}M_{c3}O_2$ (here, M is at least any one selected from the group consisting of Co, Ni, Fe, Cr, Zn and Ta, and c3 satisfies $0.01 \leq c3 \leq 0.1$) or $Li_2Mn_3MO_8$ (here, M is at least any one selected from the group consisting of Fe, Co, Ni, Cu and Zn); $LiMn_2O_4$ in which Li of the chemical formula is partially substituted with an alkaline earth metal ion, and the like, but is not limited thereto. The positive electrode may be Li-metal.

The positive electrode active material layer may comprise a positive electrode conductive material and a positive electrode binder together with the above-described positive electrode active material.

In this case, the positive electrode conductive material is used to impart conductivity to the electrode, and can be used without particular limitation as long as the positive electrode conductive material has electron conductivity without causing a chemical change in a battery to be constituted. Specific examples thereof comprise graphite such as natural graphite or artificial graphite; a carbon-containing material such as carbon black, acetylene black, Ketjen black, channel black, furnace black, lamp black, thermal black, and carbon fiber; metal powder or metal fiber such as copper, nickel, aluminum, and silver; a conductive whisker such as zinc oxide and potassium titanate; a conductive metal oxide such as titanium oxide; or a conductive polymer such as a polyphenylene derivative, and any one thereof or a mixture of two or more thereof may be used.

The positive electrode binder serves to improve the bonding between positive electrode active material particles and the adhesion between the positive electrode active material and the positive electrode current collector layer. Specific examples thereof may comprise polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used.

The separator separates the negative electrode and the positive electrode and provides a passage for movement of lithium ions, and can be used without particular limitation as long as the separator is typically used as a separator in a secondary battery, and in particular, a separator having an excellent ability to retain moisture of an electrolyte as well as low resistance to ion movement in the electrolyte is preferable. Specifically, it is possible to use a porous polymer film, for example, a porous polymer film formed of a polyolefin-based polymer such as an ethylene homopolymer, a propylene homopolymer, an ethylene/butene copolymer, an ethylene/hexene copolymer, and an ethylene/methacrylate copolymer, or a laminated structure of two or more layers thereof. In addition, a typical porous non-woven fabric, for example, a non-woven fabric made of a glass fiber having a high melting point, a polyethylene terephthalate fiber, and the like may also be used. Furthermore, a coated separator comprising a ceramic component or a polymeric material may be used to secure heat resistance or mechanical strength and may be selectively used as a single-layered or multi-layered structure.

Examples of the electrolyte comprise an organic liquid electrolyte, an inorganic liquid electrolyte, a solid polymer electrolyte, a gel-type polymer electrolyte, a solid inorganic electrolyte, a molten-type inorganic electrolyte, and the like, which can be used in the preparation of a lithium secondary battery, but are not limited thereto.

Specifically, the electrolyte may comprise a non-aqueous organic solvent and a lithium salt.

As the non-aqueous organic solvent, it is possible to use, for example, a non-quantum organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

In particular, among the carbonate-based organic solvents, cyclic carbonates ethylene carbonate and propylene carbonate may be preferably used because the cyclic carbonates have high permittivity as organic solvents of a high viscosity and thus dissociate a lithium salt well, and such a cyclic carbonate may be more preferably used since the cyclic carbonate may be mixed with a linear carbonate of a low viscosity and low permittivity such as dimethyl carbonate and diethyl carbonate in an appropriate ratio and used to prepare an electrolyte having a high electric conductivity.

As the metal salt, a lithium salt may be used, the lithium salt is a material which is easily dissolved in the non-aqueous electrolyte, and for example, as an anion of the lithium salt, it is possible to use one or more selected from the group consisting of $F^-$, $Cl^-$, $I^-$, $NO_3^-$, $N(CN)_2^-$, $BF_4^-$, $ClO_4^-$, $PF_6^-(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

In the electrolyte, for the purpose of improving the service life characteristics of a battery, suppressing the decrease in battery capacity, and improving the discharge capacity of the battery, one or more additives, such as, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may be further included in addition to the above electrolyte constituent components.

An exemplary embodiment of the present invention provides a battery module comprising the secondary battery as a unit cell, and a battery pack comprising the same. The battery module and the battery pack comprise the secondary battery which has high capacity, high rate properties, and cycle properties, and thus, may be used as a power source of a medium-and-large sized device selected from the group consisting of an electric car, a hybrid electric vehicle, a plug-in hybrid electric vehicle, and a power storage system.

Hereinafter, preferred embodiments will be suggested to facilitate understanding of the present invention, but the embodiments are only provided to illustrate the present invention, and it is apparent to those skilled in the art that various alterations and modifications are possible within the scope and technical spirit of the present invention, and it is natural that such alterations and modifications also fall within the accompanying claims.

EXAMPLES

Example 1: Preparation of Negative Electrode

Preparation of First Negative Electrode Slurry

A first negative electrode composition was formed using Si (average particle diameter (D50): 3.5 μm) as a silicon-containing active material, a first conductive material, a second conductive material, and polyacrylamide as a binder at a weight ratio of 80:9.6:0.4:10, and added to distilled water as a solvent for forming a negative electrode slurry to prepare a first negative electrode slurry.

The first conductive material was plate-like graphite (specific surface area: 17 m²/g, average particle diameter (D50): 3.5 μm), and the second conductive material was SWCNT.

After the first conductive material, the second conductive material, the binder and water were dispersed at 2500 rpm for 30 minutes using a homo mixer as a mixing method, an active material was added thereto, and then the resulting mixture was dispersed at 2500 rpm for 30 minutes to prepare a first negative electrode slurry.

Preparation of Second Negative Electrode Slurry

A second negative electrode slurry was prepared in the same manner as in the preparation of the first negative electrode slurry, except that SiO (D50: 6 μm) as the silicon-containing active material, the first conductive material, the second conductive material and polyacrylamide as the binder were used at a weight ratio of 65:19.5:0.5:15 to prepare a second negative electrode slurry.

Thereafter, both surfaces of a copper current collector (thickness: 8 μm) as a negative electrode current collector were coated with the first negative electrode slurry at a loading amount of 94 mg/25 cm², and simultaneously, the second negative electrode slurry was coated thereon at a loading amount of 38 mg/25 cm² by the wet on wet method and dried. In this case, the solid content of the first negative electrode slurry was 25%, and the solid content of the second negative electrode slurry was 28%.

As the above solid contents were satisfied, inter-mixing occurred in the drying process, so that there was a process in which the two active material layers are mixed.

Thereafter, the resulting coated current collector was roll pressed and dried at 130° C. in a vacuum oven for 10 hours, thereby forming a negative electrode active material layer (thickness: 65 μm), which was used as a negative electrode.

The ratios of the negative electrode active materials in the negative electrode active material layer, the surface region, and the junction region showed a ratio of Si:SiO=75:25, a ratio of Si:SiO=3:97, and a ratio of Si:SiO=97:3, respectively.

(Thickness of the Negative Electrode: 73 μm, Porosity of the Negative Electrode: 40%)

Example 2: Preparation of Negative Electrode

Preparation of first negative electrode slurry A first negative electrode composition was formed using Si (average particle diameter (D50): 3.5 μm) as a silicon-containing active material, SWCNT as a conductive material, and polyacrylamide as a binder at a weight ratio of 89.5:0.5:10, and added to distilled water as a solvent for forming a negative electrode slurry to prepare a first negative electrode slurry.

After the SWCNT, the binder and water were dispersed at 2500 rpm for 30 minutes using a homo mixer as a mixing method, an active material was added thereto, and then the resulting mixture was dispersed at 2500 rpm for 30 minutes to prepare a first negative electrode slurry.

Preparation of Second Negative Electrode Composition

A second negative electrode slurry was prepared in the same manner as in the preparation of the first negative electrode slurry, except that SiO (D50: 6 μm) as the silicon-containing active material, SWCNT as the conductive material, and polyacrylamide as the binder were used at a weight ratio of 84.5:0.5:15.

Thereafter, both surfaces of a copper current collector (thickness: 8 μm) as a negative electrode current collector were coated with the first negative electrode slurry at a loading amount of 94 mg/25 cm², and simultaneously, the second negative electrode slurry was coated thereon at a loading amount of 38 mg/25 cm² by the wet on wet method and dried. In this case, the solid content of the first negative electrode slurry was 25%, and the solid content of the second negative electrode slurry was 28%.

As the above solid contents were satisfied, inter-mixing occurred in the drying process, so that there was a process in which the two active material layers are mixed. Thereafter, the resulting coated current collector was roll pressed and dried at 130° C. in a vacuum oven for 10 hours, thereby forming a negative electrode active material layer (thickness: 65 μm), which was used as a negative electrode.

The ratios of the negative electrode active materials in the negative electrode active material layer, the surface region, and the junction region showed a ratio of Si:SiO=75:25, a ratio of Si:SiO=3:97, and a ratio of Si:SiO=97:3, respectively.

Example 3: Preparation of Negative Electrode

Preparation of first negative electrode slurry A first negative electrode composition was formed using Si (average particle diameter (D50): 3.5 μm) as a silicon-containing active material, a first conductive material (dotted conductive material, D50=50 nm), a second conductive material (SWCNT), a third conductive material (planar conductive material, D50=3.5 μm) and polyacrylamide as a binder at a weight ratio of 70:9.6:0.4:10:10, and added to distilled water as a solvent for forming a negative electrode slurry to prepare a first negative electrode slurry.

After the three conductive materials, the binder and water were dispersed at 2500 rpm for 30 minutes using a homo mixer as a mixing method, an active material was added thereto, and then the resulting mixture was dispersed at 2500 rpm for 30 minutes to prepare a slurry.
Preparation of Second Negative Electrode Slurry A second negative electrode slurry was prepared in the same manner as in the preparation of the first negative electrode slurry, except that SiO (D50: 6 μm) as the silicon-containing active material, the first conductive material (dotted conductive material D50=50 nm), the second conductive material (SWCNT), the third conductive material (planar conductive material, D50=3.5 μm) and polyacrylamide as the binder were used at a weight ratio of 60:9.5:0.5:10:15.

Thereafter, both surfaces of a copper current collector (thickness: 8 μm) as a negative electrode current collector were coated with the first negative electrode slurry at a loading amount of 94 mg/25 cm$^2$, and simultaneously, the second negative electrode slurry was coated thereon at a loading amount of 38 mg/25 cm$^2$ by the wet on wet method and dried. In this case, the solid content of the first negative electrode slurry was 25%, and the solid content of the second negative electrode slurry was 28%.

As the above solid contents were satisfied, inter-mixing occurred in the drying process, so that there was a process in which the two active material layers are mixed. Thereafter, the resulting coated current collector was roll pressed and dried at 130° C. in a vacuum oven for 10 hours, thereby forming a negative electrode active material layer (thickness: 65 μm), which was used as a negative electrode.

The ratios of the negative electrode active materials in the negative electrode active material layer, the surface region, and the junction region showed a ratio of Si:SiO=75:25, a ratio of Si:SiO=3:97, and a ratio of Si:SiO=97:3, respectively.

Example 4: Preparation of Negative Electrode

A negative electrode was formed in the same manner as in Example 1, except that both surfaces of the copper current collector were coated with the first negative electrode slurry at a loading amount of 85 mg/25 cm$^2$, and simultaneously, the second slurry was coated thereon at a loading amount of 43 mg/25 cm$^2$ by the wet on wet method and dried in Example 1. In this case, the ratio of the negative electrode active materials in the negative electrode active material layer showed a ratio of Si:SiO=65:35.

The ratios of the negative electrode active materials in the surface region and the junction region showed a ratio of Si:SiO=5:95 and a ratio of Si:SiO=95:5.

(Thickness of the Negative Electrode: 73 μm, Porosity of the Negative Electrode: 40%)

Example 5: Preparation of Negative Electrode

A negative electrode was formed in the same manner as in Example 1, except that both surfaces of the copper current collector were coated with the first negative electrode slurry at a loading amount of 102 mg/25 cm$^2$, and simultaneously, the second slurry was coated thereon at a loading amount of 31 mg/25 cm$^2$ by the wet on wet method and dried in Example 1. In this case, the ratio of the negative electrode active materials in the negative electrode active material layer showed a ratio of Si:SiO=85:15.

The ratios of the negative electrode active materials in the surface region and the junction region showed a ratio of Si:SiO=1:99 and a ratio of Si:SiO=99:1.

(Thickness of the Negative Electrode: 73 μm, Porosity of the Negative Electrode: 40%)

Comparative Example 1: Preparation of Negative Electrode

Both surfaces of a copper current collector (thickness: 8 μm) as a negative electrode current collector were coated with the first negative electrode slurry prepared in Example 1 and the first negative slurry was dried, thereby forming a negative electrode active material layer and manufacturing a negative electrode.

Comparative Example 2: Preparation of Negative Electrode

Both surfaces of a copper current collector (thickness: 8 μm) as a negative electrode current collector were coated with the second negative electrode slurry prepared in Example 1 and the second negative slurry was dried, thereby forming a negative electrode active material layer and manufacturing a negative electrode.

Comparative Example 3: Preparation of Negative Electrode

A negative electrode was manufactured by forming a negative electrode active material layer in the same manner as in Example 1, except that both surfaces of the copper current collector (thickness: 8 μm) as the negative electrode current collector were coated with the second negative electrode slurry prepared in Example 1 at a loading amount of 38 mg/25 cm$^2$, and simultaneously, the first negative electrode slurry prepared in Example 1 was coated thereon at a loading amount of 94 mg/25 cm$^2$ by the wet on wet method and dried.

The ratios of the negative electrode active materials in the negative electrode active material layer, the surface region, and the junction region showed a ratio of Si:SiO=75:25, a ratio of Si:SiO=95:5, and a ratio of Si:SiO=5:95, respectively.

Comparative Example 4: Preparation of Negative Electrode

A negative electrode was manufactured by forming a negative electrode active material layer in the same manner as in Example 1, except that both surfaces of the copper current collector (thickness: 8 μm) as the negative electrode current collector were coated with the first negative electrode slurry prepared in Example 1 at a loading amount of 63 mg/25 cm², and simultaneously, the second negative electrode slurry prepared in Example 1 was coated thereon at a loading amount of 77 mg/25 cm² by the wet on wet method and dried.

The ratio of the negative electrode active materials in the negative electrode active material layer showed a ratio of Si:SiO=50:50.

Comparative Example 5: Preparation of Negative Electrode

A negative electrode was manufactured by forming a negative electrode active material layer in the same manner as in Example 1, except that both surfaces of the copper current collector (thickness: 8 μm) as the negative electrode current collector were coated with the first negative electrode slurry prepared in Example 1 at a loading amount of 120 mg/25 cm², and simultaneously, the second negative electrode slurry prepared in Example 1 was coated thereon at a loading amount of 22 mg/25 cm² by the wet on wet method and dried.

The ratio of the negative electrode active materials in the negative electrode active material layer showed a ratio of Si:SiO=90:10.

For the negative electrodes of Examples 1 to 5 and Comparative Examples 1 to 5, cell energy density, initial capacity (based on 4.2 to 3.0 V), service life performance (@300 cycle), and 2.5 C discharge resistance increase @SOC50 (after 300 cycle) were each measured as in the following Table 1, and the results are shown in the following Table 1.

higher content of SiO on the surface opposite to the surface facing the negative electrode current collector layer than a content of SiO on the surface facing the negative electrode current collector layer.

Accordingly, it could be confirmed by the service life performance and resistance increase rate in Table 1 that the negative electrode has a feature capable of solving the reaction heterogeneity in the depth direction of the negative electrode in spite of repetition of the cycle of the battery by allowing a large amount of SiO having better reaction durability than Si to be distributed on the uppermost surface of the negative electrode.

In the case of Comparative Example 1, 100% of Si as the negative electrode active material was applied, and the cell energy density was formed to be high and the initial capacity was high, but it could be confirmed that according to the charging and discharging, the service life performance deteriorated as the reaction on the surface portion of the Si active material layer is concentrated, and the discharge resistance increase was also high.

In the case of Comparative Example 2, 100% of SiO as the negative electrode active material was applied, and the service life performance itself was excellent because the degree of expansion of the SiO active material is less than that of Si, but it could be confirmed that the performance of the negative electrode was not better than that in Example 1 because the cell energy density was reduced.

Comparative Example 3 is a case where the proportion of Si on the surface (surface region) of the negative electrode active material layer is high unlike Example 1, and the cell energy density was at an equivalent level, but SiO, which is

TABLE 1

|  | Example 1 | Example 2 | Example 3 | Example 4 | Example 5 |
|---|---|---|---|---|---|
| Cell energy density | 870 Wh/L | 910 Wh/L | 850 Wh/L | 820 Wh/L | 962 Wh/L |
| Initial capacity (based on 4.2 to 3.0 V) | 121 mAh | 122 mAh | 121 mAh | 120 mAh | 125 mAh |
| Service life performance (@300 cycle) | 85% | 83% | 84% | 89% | 83% |
| 2.5 C discharge resistance increase @SOC50 (after 300 cycle) | 68% | 70% | 72% | 69% | 73% |

|  | Comparative Example 1 | Comparative Example 2 | Comparative Example 3 | Comparative Example 4 | Comparative Example 5 |
|---|---|---|---|---|---|
| Cell energy density | 950 Wh/L | 480 Wh/L | 870 Wh/L | 780 Wh/L | 976 W/L |
| Initial capacity (based on 4.2 to 3.0 V) | 123 mAh | 120 mAh | 113 mAh | 118 mAh | 127 mAh |
| Service life performance (@300 cycle) | 78% | 92% | 75% | 80% | 79% |
| 2.5 C discharge resistance increase @SOC50 (after 300 cycle) | 74% | 63% | 76% | 73% | 79% |

As can be confirmed in Table 1, in the case of the negative electrodes for a lithium secondary battery according to Examples 1 to 5, the capacity of the negative electrode may be maximized by comprising Si and SiO as negative electrode active materials in a specific content. Further, the negative electrode active material layer is formed to have a less reactive with Li than Si did not participate in the actual reaction because the SiO was disposed on the side of the negative electrode current collector, and it could be confirmed that the durability due to a heterogeneous reaction deteriorated because an effect of increasing the depth of use of Si rather appeared. Similarly, during pre-lithiation, a large amount of Si is provided on the surface of the negative electrode, resulting in rapid degradation of the surface compared to the case where SiO is provided on the surface of the negative electrode, so that the service life durability can be expected to deteriorate.

In the case of Comparative Example 4, Si:SiO=50:50 as the negative electrode active material was applied, and the service life performance was relatively excellent because SiO was included in a larger content than in Example 1, but it could be confirmed that the performance of the negative electrode was not better than that in Example 1 because the cell energy density was reduced.

In the case of Comparative Example 5, Si:SiO=90:10 as the negative electrode active material was applied, and the energy density and capacity characteristics could be excellent because Si was included in a larger content in Example 1, but it could be confirmed that when the charging and discharging cycle of the battery was repeated, the service life performance deteriorated and the resistance increase rate was high because the reaction heterogeneity in the depth direction of the negative electrode active material layer was increased.

When Examples 1 to 3 are compared, in the case of Example 1, two types of linear conductive material and planar conductive material were included, and it could be confirmed that the initial capacity exhibited a level equivalent to those of the case where one type of conductive material was included or Examples 2 and 3 in which three types of conductive materials were included, but the service life performance was excellent, and in particular, the discharge resistance-related effect was excellent. This is because the negative electrode for a lithium secondary battery according to the present invention does not significantly affect the service life characteristics of an existing lithium secondary battery, has many points where the battery can be charged and discharged, and thus has excellent output characteristics at high C-rate.

With reference to the Examples and Comparative Examples and the present specification, it can be seen that in the negative electrode for a lithium secondary battery according to an exemplary embodiment of the present invention, the ratio of Si:SiO included in the negative electrode active material satisfies 65:35 to 85:15. That is, it could be confirmed that Si and SiO were included at the aforementioned weight ratio in order to maximize the capacity characteristics while using a single-layered negative electrode active material layer, and further, the capacity and service life characteristics of a lithium secondary battery comprising the negative electrode were enhanced by minimizing the content part of Si on the surface portion of the negative electrode active material layer to enhance the durability of the electrode through a concentration gradient of SiO in the negative electrode active material layer with a respect to a problem of the service life characteristics caused by the electrode surface degradation.

REFERENCE NUMERAL 1-1: the junction region
1-3: the surface region
10: negative electrode current collector layer
20: negative electrode active material layer
30: separator
40: positive electrode active material layer
50: positive electrode current collector layer
100: negative electrode for a lithium secondary battery
200: positive electrode for a lithium secondary battery

What is claimed is:

1. A negative electrode for a lithium secondary battery, comprising:
   a negative electrode current collector layer; and
   a negative electrode active material layer provided on at least one surface of the negative electrode current collector layer,
   wherein the at least one negative electrode active material layer comprises a negative electrode composition comprising: a negative electrode active material; a negative electrode conductive material; and a negative electrode binder,
   wherein the negative electrode active material comprises Si and SiO,
   a weight ratio of the Si: SiO is in a range of 65:35 to 85:15,
   wherein the Si has an average particle diameter D50 of 1 µm or more and 10 µm or less,
   wherein the SiO has an average particle diameter D50 of 1 µm or more and 10 µm or less,
   an amount of SiO on a surface opposite to a surface of the negative electrode active material layer facing the negative electrode current collector layer is higher than an amount of SiO on the surface facing the negative electrode current collector layer, and
   further comprising on the negative electrode active material layer: (i) a junction region comprising the surface facing the negative electrode current collector layer; and (ii) a surface region comprising the surface opposite to the surface facing the negative electrode current collector layer, wherein a weight ratio of the Si: SiO in the junction region is 95:5 to 100:0, and wherein a weight ratio of the Si: SiO in the surface region is 5:95 to 0:100.

2. The negative electrode of claim 1, wherein the at least one negative electrode active material layer has a first concentration gradient where the amount of SiO is increased in a direction from the surface facing the negative electrode current collector layer to the surface opposite to the surface facing the negative electrode current collector layer.

3. The negative electrode of claim 1, wherein the negative electrode active material is present in an amount of 60 parts by weight or more based on 100 parts by weight of the negative electrode composition.

4. The negative electrode of claim 1, wherein the negative electrode conductive material comprises: a planar conductive material, and a linear conductive material.

5. The negative electrode of claim 4, wherein the negative electrode active material layer has a concentration gradient where an amount of the planar conductive material is increased in a direction from the surface facing the negative electrode current collector layer to the surface opposite to the surface facing the negative electrode current collector layer.

6. The negative electrode of claim 4, wherein the planar conductive material and the linear conductive material are comprised in an amount of 90 parts by weight or more and 99.9 parts by weight or less and 0.1 part by weight or more and 10 parts by weight or less, respectively, based on 100 parts by weight of the negative electrode conductive material.

7. The negative electrode of claim 1, wherein the negative electrode current collector layer has a thickness of 1 µm or more and 100 µm or less, and
   wherein the negative electrode active material layer has a thickness of 20 µm or more and 500 µm or less.

8. The negative electrode of claim 1, wherein the negative electrode active material layer is present on both surfaces of the negative electrode current collector.

9. The negative electrode of claim 1, wherein the at least one negative electrode active material layer comprises three regions in the thickness direction, and is sequentially divided as:
- a first active material layer region;
- a second active material layer region; and
- a third active material layer region, wherein
- the first active material layer region faces the negative electrode current collector layer,
- the first active material layer region comprises SiO in an amount of 10 parts by weight or less based on 100 parts by weight of the negative electrode active material, and
- the third active material layer region comprises SiO in an amount of 80 parts by weight or more based on 100 parts by weight of the negative electrode active material.

10. A lithium secondary battery comprising:
- a positive electrode;
- the negative electrode for a lithium secondary battery of claim 1;
- a separator provided between the positive electrode and the negative electrode; and
- an electrolyte.

* * * * *